US007873832B2

(12) United States Patent
Feingold et al.

(10) Patent No.: US 7,873,832 B2
(45) Date of Patent: Jan. 18, 2011

(54) MECHANISM FOR SECURE PARTICIPATION IN A TRANSACTION BY A THIRD PARTY (75) Inventors: Max A. Feingold, Bellvue, WA (US); David E. Langworthy, Kirkland, WA (US); Christopher G. Kaler, Sammamish, WA (US); James E. Johnson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 926 days.

(21) Appl. No.: 10/921,669

(22) Filed: Aug. 19, 2004

(65) Prior Publication Data

US 2006/0041744 A1 Feb. 23, 2006

(51) Int. Cl.
H04L 9/00 (2006.01)
H04L 9/32 (2006.01)
(52) U.S. Cl. .................. 713/170; 713/155; 707/607
(58) Field of Classification Search ............... None
See application file for complete search history.

(56) References Cited

U.S. PATENT DOCUMENTS

| 6,904,521 B1* | 6/2005 | Jivsov ................. 713/155 |
| 7,047,243 B2* | 5/2006 | Cabrera et al. ............. 707/10 |
| 2001/0054064 A1* | 12/2001 | Kannan .................. 709/203 |
| 2002/0042830 A1* | 4/2002 | Bose et al. .............. 709/230 |
| 2002/0087496 A1* | 7/2002 | Stirpe et al. ............. 706/45 |
| 2002/0107803 A1* | 8/2002 | Lisanke et al. ............ 705/51 |
| 2002/0129106 A1* | 9/2002 | Gutfreund .............. 709/205 |
| 2003/0014488 A1* | 1/2003 | Dalal et al. .............. 709/204 |
| 2003/0144894 A1* | 7/2003 | Robertson et al. ............ 705/8 |
| 2004/0024731 A1* | 2/2004 | Cabrera et al. .............. 707/1 |
| 2005/0034079 A1* | 2/2005 | Gunasekar et al. .......... 715/753 |
| 2005/0044413 A1* | 2/2005 | Elms et al. .............. 713/201 |
| 2005/0076248 A1* | 4/2005 | Cahill et al. ............. 713/202 |
| 2005/0097159 A1* | 5/2005 | Skidgel ................ 709/200 |
| 2005/0165656 A1* | 7/2005 | Frederick et al. ............ 705/26 |
| 2005/0257045 A1* | 11/2005 | Bushman et al. ............ 713/156 |
| 2006/0143108 A1* | 6/2006 | Thompson et al. ............ 705/37 |

OTHER PUBLICATIONS

Luis Felipe Cabrera et al., "Web Services Coordination (WS-Coordination)," Sep. 2003, BEA Systems, International Business Machines Corporation, and Microsoft Corporation.*
Felipe Cabrera et al., "Web Services Coordination (WS-Coordination)," Aug. 9, 2002, BEA Systems, International Business Machines Corporation, and Microsoft Corporation.*

* cited by examiner

*Primary Examiner*—Matthew B Smithers
*Assistant Examiner*—Luu Pham
(74) *Attorney, Agent, or Firm*—Workman Nydegger (57) ABSTRACT Mechanisms for securely allowing a participant computing entity to engage in a transaction initiated by an initiator computing entity and managed by a coordinator computing entity. The initiator provides a transaction initiation request to the coordinator. Upon receipt, the coordinator accessing a transaction coordination context that includes information such as a secure key that may be used by a participant to register in the transaction. The coordinator then provides the coordination context to the initiator, which provides the coordination context to the participant(s) that are also to engage in the transaction. Each participant then generates a registration request that is based on the coordination context, and that is secured using the secure key provided in the coordination context.

23 Claims, 3 Drawing Sheets

MECHANISM FOR SECURE PARTICIPATION IN A TRANSACTION BY A THIRD PARTY

BACKGROUND OF THE INVENTION

1. The Field of the Invention

The present invention relates to computing technology; and more specifically, to mechanisms for allowing a third party computing entity to participate in a message transaction that the third party was not involved with creating.

2. Background and Related Art

Computing technology has transformed the way we work and play. Computing systems now take a wide variety of forms including desktop computers, laptop computers, tablet PCs, Personal Digital Assistants (PDAs), household devices and the like. In its most basic form, a computing system includes system memory and one or more processors. Software in the system memory may be executed by the processor to direct the other hardware of the computing system to perform desired functions.

More abstractly, a "computing entity" may be any computing system or device (or even any application or component running thereon) that is capable of communicating with another computing entity similarly enabled to communicate. Much of the functionality provided by computing entities relies on the ability of multiple computing entities to cooperatively communicate to accomplish a particular task. In order to accomplish a task, the computing entities engage in a message transaction involving multiple message exchanges.

There is often a predicable and expected pattern of message exchange between the two computing entities in order to accomplish a particular task. For example, in accordance with an arbitrary example message exchange pattern, a first computing entity may transmit a first kind of message to the second computing entity. In response, the second computing system may then return to the first computing entity a second or third type of message, and so on as prescribed by the appropriate message exchange pattern.

In order to engage in some message exchange patterns, more than two computing entities collaborate to accomplish a particular task. However, it is difficult once a message transaction is created between two computing entities to securely allow a third (or fourth or so on) computing entity to engage in the transaction. Accordingly, what would be advantageous is a mechanism for allowing third parties who were not involved in the creation of the transaction to register in the transaction in a secure manner.

BRIEF SUMMARY OF THE INVENTION

The foregoing problems with the prior state of the art are overcome by the principles of the present invention, which may be implemented in an environment in which a coordinator computing entity, an initiator computing entity, and one or more participant computing entities cooperatively interact in a message transaction in order to accomplish a transaction-oriented objective. The coordinator computing entity manages the transaction to ensure proper state is maintained and that the transaction is secure. The initiator computing entity initiates the transaction. The participant computing entity engages in message exchanges and has a particular relationship in the transaction.

The mechanism permits the participant computing entities to securely participate in the transaction even though it is the initiator computing entity, rather than the participant computing entity, that initiates the transaction. Specifically, the initiator computing entity provides a transaction initiation request to the coordinator computing entity. Upon receipt, the coordinator computing entity accesses a coordination context for the transaction. The coordination context includes information that may be used by a participant computing entity to register in the transaction and includes a secure key. The coordinator computing entity then provides a transaction initiation response to the initiator computing entity.

The initiator computing entity may then provide the coordination context to the one or more participant computing entities that are also to engage in the transaction. Each participant computing entity then generates a registration request that is based on the coordination context, and that is secured using the secure key provided in the coordination context. The participant then registers as having a particular relationship in the transaction by providing the secured registration request to the coordinator computing entity.

The coordinator computing entity ensures that the coordination context has been legitimately passed from the initiator computing entity to the participant computing entity by examining the registration request to make sure it has been secured (e.g., electronically signed) using the secure key provided in the coordination context. If it has been legitimately passed, the participant computing entity is registered in the transaction as having a particular relationship in the transaction. Accordingly, the use of the secure key provided in the coordination context in order to secure the registration request provides significant security by avoiding participation in the transaction by those who did not legitimately receive the coordination context.

Using additional security, the coordinator computing entity may use roles to ensure that the initiator computing entity is indeed authorized to initiate transactions with the coordinator computing entity. This prevents any random computing entity from causing the coordinator computing entity to create a transaction.

Furthermore, when the participant computing entity registers with the coordinator computing entity, the coordinator computing entity may once again use roles to determine that the participant computing entity is indeed authorized to register with the coordinator computing entity with respect to that transaction.

Finally, the coordinator computing entity may monitor subsequent communications made by a participant computing entity to ensure that the actions requested are consistent with the specific relationship assigned to that participant computing entity in the transaction. This discourages one participant computing entity from performing inappropriate actions such as spoofing another participant computing entity involved in the transaction.

Accordingly, the principles of the present invention provide a secure way for a participant computing entity to engage in message transactions even though the participant was not involved with the initiation of the transaction. Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to a mechanism for securely allowing a participant computing entity to engage in a transaction initiated by an initiator computing entity and managed by a coordinator computing entity. The initiator computing entity provides a transaction initiation request to the coordinator computing entity. Upon receipt, the coordinator computing entity accesses a transaction coordination context that includes information such as a secure key that may be used by a participant computing entity to register in the transaction. The coordinator computing entity then provides the coordination context to the initiator computing entity, which in turn provides the coordination context to the participant computing entities that are also to engage in the transaction. Each participant computing entity then generates a registration request that is based on the coordination context, and that is secured using the secure key provided in the coordination context.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

Figure 1:
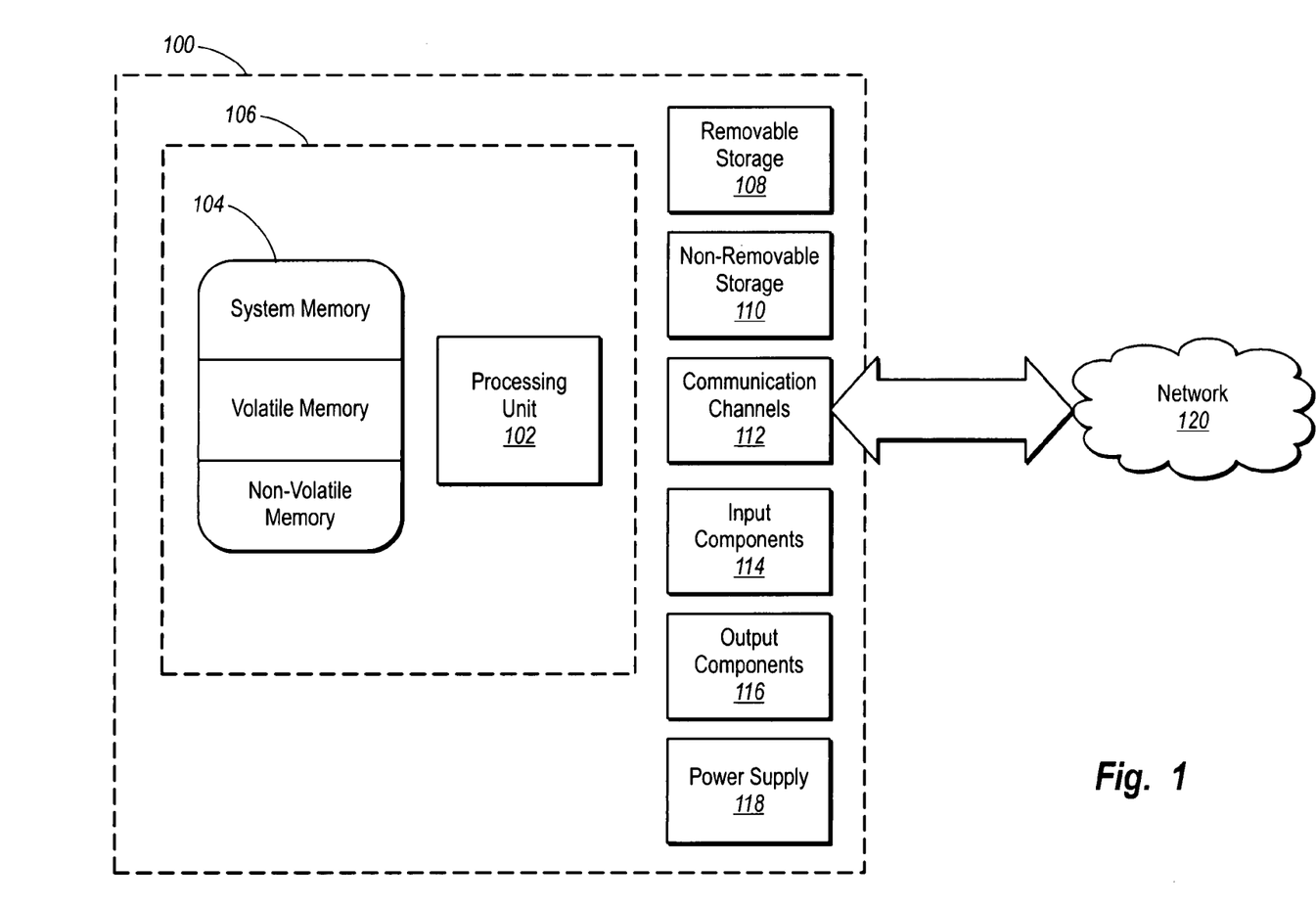
FIG. 1 illustrates a suitable computing system that may implement features of the present invention.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also FIG. 1 shows a schematic diagram of an example computer architecture usable for these devices be implemented in hardware.

For descriptive purposes, the architecture portrayed is only one example of a suitable environment and is not intended to suggest any limitation as to the scope of use or functionality of the invention. Neither should the computing systems be interpreted as having any dependency or requirement relating to anyone or combination of components illustrated in FIG. 1.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices over network 120. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
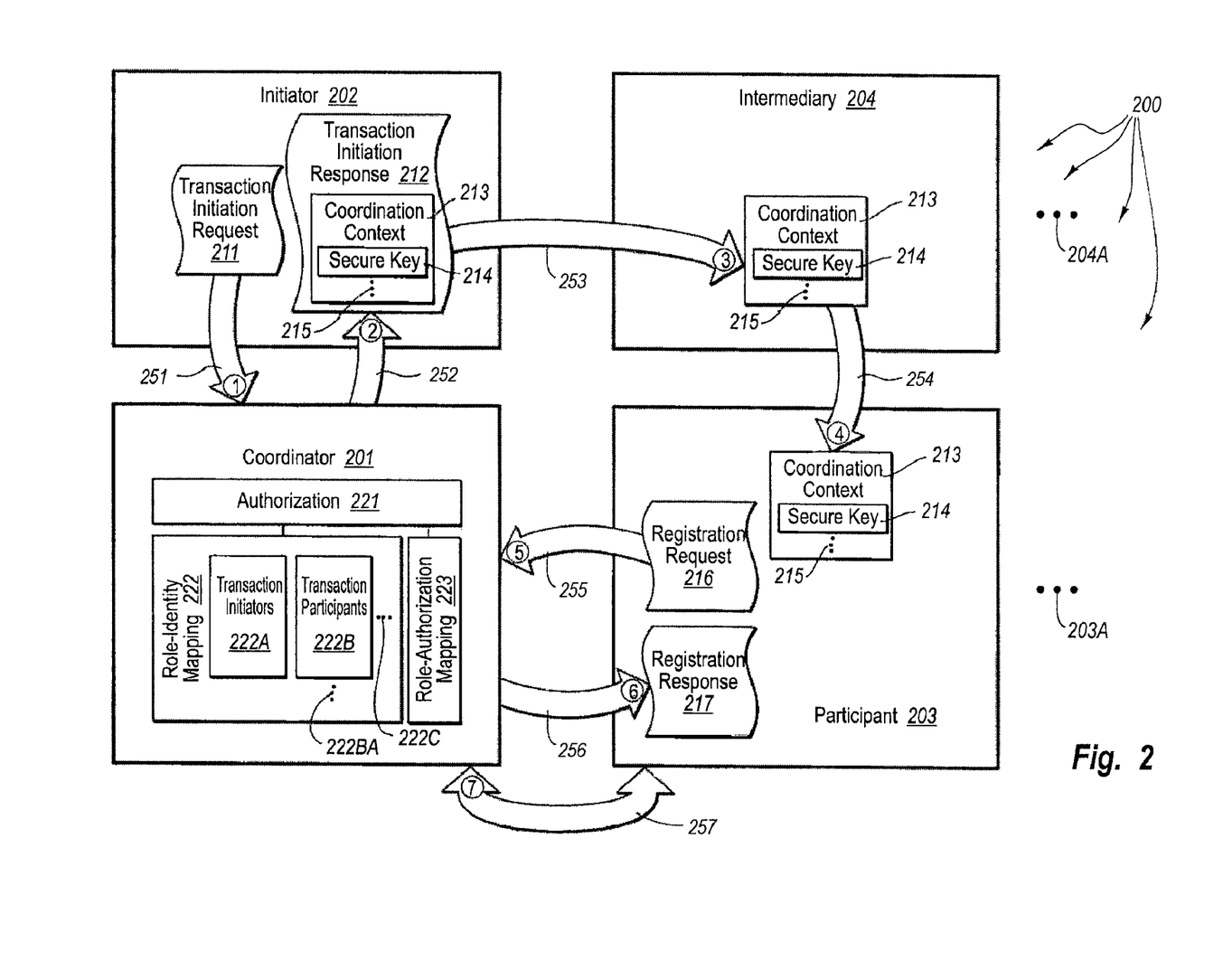
FIG. 2 illustrates an environment in which multiple computing entities cooperatively interact in order to allow a participant computing entity to register in a message transaction without having been involved with the initial message transaction creation in accordance with the principles of the present invention.

FIG. 2 illustrates an environment 200 in which the principles of the present invention may be employed. The environment 200 includes a coordinator computing entity 201, an initiator computing entity 202 and a participant computing entity 203. The environment 200 may also optionally include an intermediary computing entity 204. The computing entities in the environment 200 collaboratively interact to engage in a message transaction that follows a particular message exchange pattern.

In this description and in the claims, a "computing entity" is defined broadly to include any computing system or device (or even any application or software component running thereon) that is capable of communicating with another computing entity also enabled to communicate. The computing entity may also be entirely implemented in hardware so long as it is capable of communicating with another computing entity. Accordingly, the computing system 100 described above with respect to FIG. 1 is only one example of numerous possible computing entities. Multiple computing entities may reside in the same locality or even the same computing system. Through this description and in the claims, the coordinator computing entity 201, the initiator computing entity 202, the participant computing entity 203 and the intermediary computing entity 204 may also be referred to herein as the coordinator 201, the initiator 202, the participant 203, and the intermediary 204, respectively.

Within the environment 200 is shown a specific message flow as represented by the 251 through 257. The specific message flow and associated message data structures of FIG. 2 will be described with reference to FIG. 3, which illustrates a flowchart of a method 300 for the coordinator 201 to securely allow the participant 203 to engage in a message transaction even though it is the initiator 202, rather than the participant 203, that initiates the transaction. Acts performed by the coordinator 201 are listed in the middle column of FIG. 3 under the heading "Coordinator". Acts performed by the initiator 202 are listed in the left column of FIG. 3 under the heading "Initiator". Acts performed by the participant 203 are listed in the right column of FIG. 3 under the heading "Participant". The intermediary 204, if present, may also perform acts which will also be described herein when relevant.

The initiator 202 initiates the transaction by providing a transaction initiation request to the coordinator 201 (act 301). For example, referring to FIG. 2, the initiator 202 provides the transaction initiation request 211 to the coordinator 201 as represented by arrow 251. Note that the arrow 251 has a circled 1 in the head of the arrow. The circled number in the head of each arrow 251 through 257 represents an example chronological ordering of associated message exchanges. In one embodiment, the transaction initiation request is a "CreateCoordinationContext" message as defined in the Web Services Coordination protocol (also known in general as and referred to herein as "the WS-Coordination protocol").

Upon receiving the transaction initiation request (act 311), the coordinator 201 may optionally implement a first level of security by determining that the initiator 202 is authorized to initiate the transaction. This may be performed by determining that the initiator is in a particular role that includes all computing entities that are authorized to initiate a transaction.

For example, referring to FIG. 2, the coordinator 201 may use an authorization component 221, which has access to role-identity mapping 222 and role-authorization mapping 223. The role-identity mapping 222 includes a transaction initiators list 222A that includes a list of all identities in the role of transaction initiators. Thus, the authorization component 221 may use the list 222A to determine that the initiator 202 is in the role of a transaction initiator. The authorization component 221 may then review the role-authorization list 223 to determine that all identities in the transaction initiator role are authorized to initiate transactions with the coordinator 201.

The coordinator 201 then accesses a coordination context for the transaction (act 312). The coordination context includes information that may be used to register in the transaction including a secure key. For example, referring to FIG. 2, the coordinator 201 may access coordination context 213, which includes a secure key 214 amongst potentially other items as represented by the vertical ellipses 215. The coordination context may be "accessed" by internally generating the coordination context, by accessing a memory location that has the coordination context, and/or by acquiring the coordination context from another computing entity. In one embodiment, the coordination context may include, for example, a "CoordinationContext" data structure as defined in the WS-Coordination protocol.

The coordinator 201 then provides a transaction initiation response that includes the generated coordination context to the initiator 202 (act 313). For example, referring to FIG. 2, the coordinator 201 provides the transaction initiation response 212 to the initiator 202 as represented by arrow 252. In one embodiment, the transaction initiation response may be a "CreateCoordinationContextResponse" message as defined in the WS-Coordination protocol.

Upon receiving the transaction initiation response (act 302), the initiator 202 provides the coordination context to the participant 203 (act 303). Referring to FIG. 2, the initiator 202 may provide the coordination context 213 first to the intermediary 204 as represented by the arrow 253. The intermediary 204 may be, for example, an application program that uses the participant 203 as a transaction manager. The intermediary 204 then provides the coordination context 213 to the participant 203 as represented by the arrow 254.

Upon receiving the coordination context for the transaction from the initiator 201 (act 321), the participant 203 generates a registration request to register in the transaction as having a relationship in the transaction, the registration request being secured using the secure key (act 322). For example, referring to FIG. 2, the participant 203 generates a registration request 216. The registration request 216 may be secured using the secure key 214 by, for example, electronically signing portions of the registration request 216 using the secure key 214. The registration request may conform to a "Register" message as defined in the WS-Coordination protocol.

The participant 203 then provides the secured registration request to the coordinator computing entity (act 323). Referring to FIG. 2, this is represented by participant 203 providing registration request 216 to coordinator 201 as represented by arrow 255.

Upon receiving the registration (act 314), the coordinator 201 determines that the participant is authorized to register in the transaction based at least in part on the registration request being secured by the secure key (act 315). Thus, a second level of authorization is performed. Specifically, this second level of authorization may be performed by the authorization component 221 identifying that the registration request 216 has been secured using the secure key 214 originally provided to the initiator 202 in the coordination context 213. This shows a legitimate passing of the secure key 214 from the initiator 202 to the participant 203, rather than having been intercepted by an unauthorized participant. In particular, the secure key 214 is provided in encrypted form between the initiator 202 and the participant 203. Thus, the participant's 203 mere possession of the decrypted version of the secure key 214 evidences a trusted relationship between the initiator 202 and the participant 203.

In addition, the security key may include an expression of one or more conditions to be met before registration is allowed. If such conditions are specified in the security key, the authorization component 221 may additionally determine whether these conditions have been met, and only authorize the participant 203 if the conditions are met.

Furthermore, the authorization component 221 may apply role-based authorization when deciding whether a registration of a participant is authorized in this transaction. For example, the authorization component 221 may refer to a transaction-specific list of transaction participants 222B. The vertical ellipses 222BA represents that there may be other similar lists for other transactions that the coordinator 201 is involved with. The authorization component 221 may use the list 222B to determine that the participant 203 is in the role of a transaction participant for the transaction, and may refer to the role-authorization mapping 223 to determine that those in the role of transaction participant are authorized to register. Accordingly, the coordinator 201 may authorize the participant 203 in a number of manners. Incidentally, the horizontal ellipses 222C represents that the role-identity mapping 222 may include other identity lists for other roles.

Upon authorizing the participant 203 (act 315), the coordinator 201 registers the participant 203 as having a relationship in the transaction (act 316). Optionally, the coordinator 201 may also notify the participant of successful registration by sending a registration response as represented by the arrow 256.

The participant 203 may then engage in post-registration exchanges with the coordinator consistent with the message transaction as represented by the bi-directional arrow 227. In one embodiment, the intermediary 204 is an application level program, while the participant 203 is layered below the intermediary 204 as a protocol level component. Similarly, the initiator 202 may be an application level program, while the coordinator 203 is layered below the initiator 202 as a protocol level component. In this case, post-registration communications 227 may be protocol level communications that are generated and consumed by the coordinator 201 and participant 203, or may be application level communications that are generated and consumed by the initiator 202 and intermediary 204.

Figure 3:
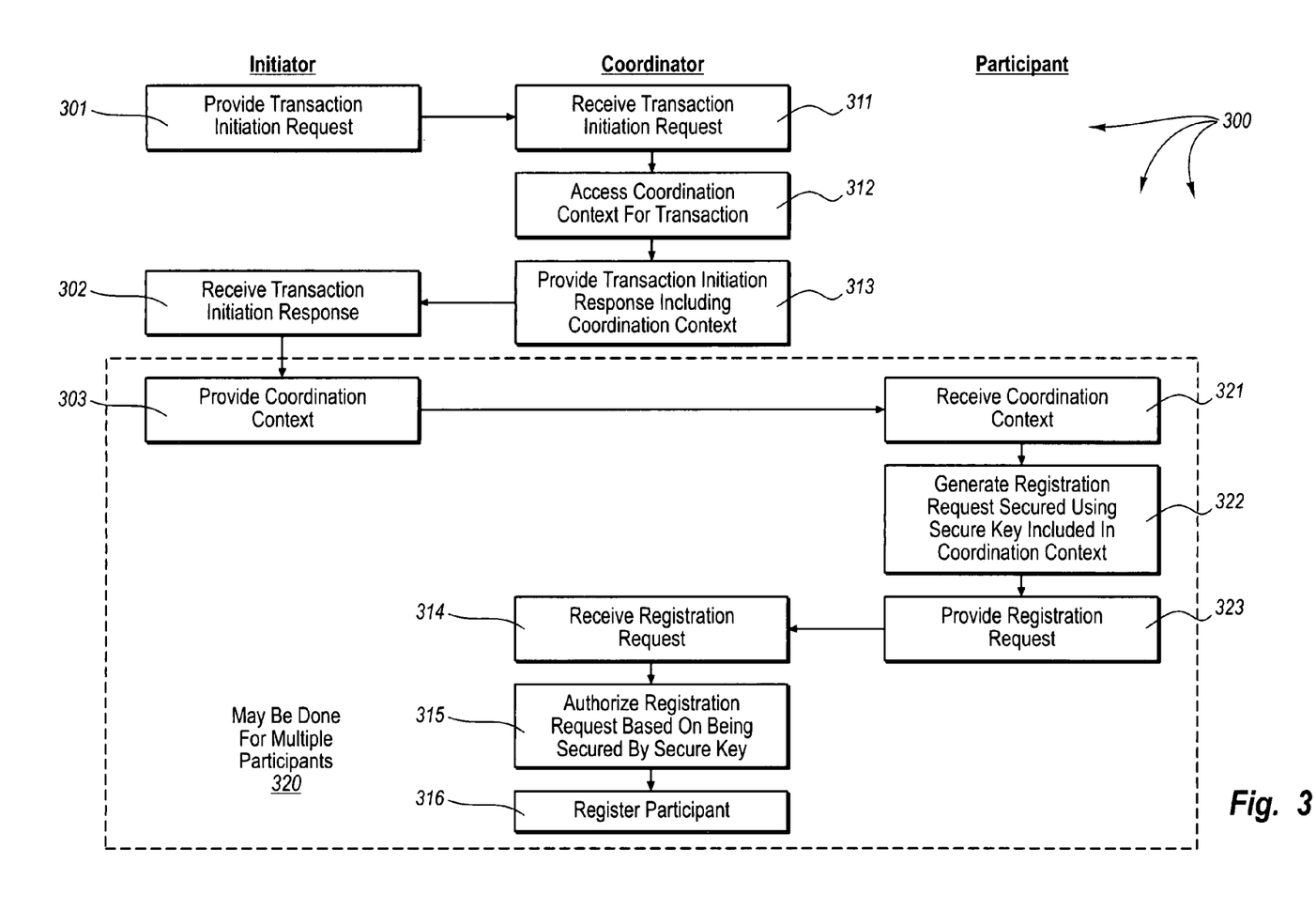
FIG. 3 illustrates a method for securely registering a participant computing entity in a message transaction in accordance with the principles of the present invention.

The secure key 214 may be specific to a transaction. In addition, the secure key 214 may also be different, depending on the protocol to be followed when the participant 203 communicates with the coordinator 201. The initiator 202 may request that the coordinator 201 generate a number of secure keys for the transaction, where each secure key gives authorization for the participant 203 to engage in post-registration communications with the coordinator 201 using a particular protocol. The initiator 202 may then choose what protocol(s) the participant 203 may use by providing appropriate secure key(s) to the participant 203. The dashed box 320 in FIG. 3 represents that the procedure described with respect to acts 303, 321-323 and 314-316 may be performed for multiple participants. For example, referring to FIG. 2, there may be many participants as represented by the horizontal ellipses 203A, and many intermediaries as represented by the horizontal ellipses 204A.

Accordingly, suppose the coordinator 201 receives a subsequent registration request from another participant to register in the transaction, where the subsequent registration request is also secured using the secure key included in the coordination context. The coordinator 201 would then likewise, determine that the participant is authorized to register in the transaction, and if appropriate register the subsequent participant as well.

This subsequent participant may have a different relationship in the transaction as compared to the first participant. For example, suppose the message transaction is to accomplish the transfer of money from one account to another. The first participant may be a debitor computing entity responsible for debiting the account to be debited, while the subsequent participant may be a creditor computing entity responsible for crediting the account to be credited. Each participant is important for accomplishing the message transaction, but each has their own unique relationship or role in the message transaction. Accordingly, when registering each participant, the coordinator 201 keeps track of each participant's relationship in the transaction.

The participant 203 may then engage in post-registration exchanges with the coordinator consistent with the message transaction as represented by the bi-directional arrow 257. In one embodiment, the intermediary 204 is an application level program, while the participant 203 is layered below the intermediary 204 as a protocol level component. Similarly, the initiator 202 may be an application level program, while the coordinator 203 is layered below the initiator 202 as a protocol level component. In this case, post-registration communications 227 may be protocol level communications that are generated and consumed by the coordinator 201 and participant 203, or may be application level communications that are generated and consumed by the initiator 202 and intermediary 204.

For example, suppose during post-registration communication as represented by arrow 257, the coordinator 201 receives a post-registration request from a first participant to do a first action that is appropriate for the registered relationship of the first participant in the transaction. The coordinator 201 may simply determine that the requested action is appropriately given the relationship, and then authorize the action. Furthermore, if the coordinator 201 receives a post-registration request from a second participant to do a second action that is appropriate for the registered relationship of the second participant, that second action may likewise be authorized. However, if either the first or second participant requests to do an action that is not consistent with their relationship in the transaction, the coordinator may deny authorization for the requested action. For example, one participant may attempt to spoof another participant by sending a message that is appropriate only for the other participant. In post-registration communications that accomplish a two phase commit transaction, this could induce data corruption in other participants.

Accordingly, the principles of the present invention provide a secure way to engage in message transactions. This mechanism permits a participant computing entity to securely engage in the transaction even though the participant was not involved with the initiation of the transaction.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In an environment that includes a coordinator computing device configured to execute computer-executable instructions stored on computer-readable storage device, an initiator computing device and a participant computing device that may collaboratively interact to engage in a message transaction, a method for the coordinator computing device to securely allow the participant computing device to engage in the transaction even though it is the initiator computing device, rather than the participant computing device, that initiates the transaction, the method comprising the following:

receiving, by the coordinator computing device, a transaction initiation request to initiate a transaction from the initiator computing device;

determining, by the coordinator computing device, that the initiator computing device is authorized to initiate the transaction;

accessing a coordination context for the transaction, the coordination context including information that may be used to register in the transaction including a secure key;

providing a transaction initiation response that includes the coordination context to the initiator computing device;

receiving a registration request from the participant computing device to register in the transaction, the registration request being secured by electronically signing the registration request using the secure key included in the coordination context;

determining, by the coordinator computing device, that the participant computing device is authorized to register in the transaction based at least in part on the registration request being electronically signed with the secure key included in the coordination context provided by the coordinator computing device to the initiator computing device and from the initiator computing device to the participant computing device, the registration request being generated by the participant computing device, wherein determining that the participate device is authorized to register in the transaction based at least in part on the registration request being electronically signed with the secure key included in the coordination context includes the coordinator computing device automatically determining that the participant computing device is authorized; and registering, by the coordinator computing device, the participant computing device in the transaction as having a relationship in the transaction.

2. The method recited in claim 1, wherein determining that the participant computing device is authorized to register in the transaction further comprises the following:

determining that the registration request is secured using the secure key included in the coordination context; and determining that the participant computing device is an identity that is one of a plurality of identities classified in a role that is authorized to register in the transaction.

3. The method recited in claim 2, wherein determining that the participant computing device is authorized to register in the transaction further comprises the following:

accessing the security key to identify one or more conditions to be met before registration is allowed; and determining that the conditions specified in the security key have been met.

4. The method recited in claim 1, wherein determining that the participant computing device is authorized to register in the transaction further comprises the following:

determining that the registration request is secured using the secure key included in the coordination context;

accessing the security key to identify one or more conditions to be met before registration is allowed; and determining that the conditions specified in the security key have been met.

5. The method recited in claim 1, wherein the registration request conforms to a Register message as defined in a WS-Coordination protocol.

6. The method recited in claim 5, wherein the transaction initiation request conforms to a CreateCoordinationContext message as defined in the WS-Coordination protocol, and the transaction initiation response conforms to a CreateCoordinationContextResponse message as defined in the WS-Coordination protocol.

7. The method recited in claim 1, wherein the coordination context is a CoordinationContext data structure as defined in the WS-Coordination protocol.

8. The method recited in claim 1, wherein determining that the initiator computing device is authorized to initiate the transaction comprises the following:

determining that the initiator computing device is in a particular role that includes all computing entities that are authorized to initiate a transaction.

9. The method recited in claim 1, wherein the participant computing device is a first participant computing device, the registration request is a first registration request, and the relationship is a first relationship, the environment further including a second participant computing device, the method further comprising the following:

receiving a second registration request from the second participant computing device to register in the transaction, the second registration request being secured using the secure key included in the coordination context; and determining that the participant computing device is authorized to register in the transaction based at least in part on the second registration request being secured by the secure key; and registering the participant computing device in the transaction as having a second relationship in the transaction.

10. The method recited in claim 9, further comprising:

receiving a first post-registration request from the first participant computing device to do a first action appropriate for the first relationship in the transaction;

determining that the first action is appropriate for the first relationship in the transaction; and authorizing the first action since the first action is appropriate for the first relationship in the transaction.

11. The method recited in claim 10, further comprising:

receiving a second post-registration request from the second participant computing device to do a second action appropriate for the second relationship in the transaction;

determining that the second action is appropriate for the second relationship in the transaction; and authorizing the second action since the second action is appropriate for the second relationship in the transaction.

12. The method recited in claim 10, further comprising:
receiving a second post-registration request from the second participant computing device to do a second action that is not appropriate for the second relationship in the transaction;
determining that the second action is not appropriate for the second relationship in the transaction; and
denying authorization for the second action since the second action is not appropriate for the second relationship in the transaction.

13. The method recited in claim 9, further comprising:
receiving a first post-registration request from the first participant computing device to do a first action that is not appropriate for the first relationship in the transaction;
determining that the first action is not appropriate for the first relationship in the transaction; and
denying authorization for the first action since the first action is not appropriate for the first relationship in the transaction.

14. A computer readable storage device for use in an environment that includes a coordinator computing device, an initiator computing device and a participant computing device that may collaboratively interact to engage in a message transaction, the computer readable storage device for implementing a method for the coordinator computing device to securely allow the participant computing device to engage in the transaction even though it is the initiator computing device, rather than the participant computing device, that initiates the transaction, the computer storage device storing computer-executable instructions that, when executed by one or more processors of the coordinator computing device, cause the coordinator computing device to perform the method, the method comprising the following:
accessing a coordination context for the transaction in response to having received a transaction initiation request from the initiator computing device, the coordination context including information that may be used to register in the transaction including a secure key;
determining that the initiator computing device is authorized to initiate the transaction;
providing a transaction initiation response that includes the coordination context to the initiator computing device;
detecting receipt of a registration request from the participant computing device to register in the transaction, the registration request being secured by electronically signing the registration request using the secure key included in the coordination context;
determining, by the coordinator computing device, that the participant computing device is authorized to register in the transaction based at least in part on the registration request being electronically signed with the secure key included the coordination context provided by the coordinator computing device to the initiator computing device and from the initiator computing device to the participant computing device, the registration request being generated by the participant computing device, wherein determining that the participate device is authorized to register in the transaction based at least in part on the registration request being electronically signed with the secure key included in the coordination context includes the coordinator computing device with the one or more processors automatically determining that the participant computing device is authorized; and
registering the participant computing device in the transaction as having a relationship in the transaction.

15. The computer readable storage device recited in claim 14, wherein determining that the participant computing device is authorized to register in the transaction further comprises the following:
determining that the registration request is secured using the secure key included in the coordination context; and
determining that the participant computing device is an identity that is one of a plurality of identities classified in a role that is authorized to register in the transaction.

16. The computer readable storage device recited in claim 15, wherein the act of determining that the participant computing device is authorized to register in the transaction further comprises the following:
accessing the security key to identify one or more conditions to be met before registration is allowed; and
determining that the conditions specified in the security key have been met.

17. The computer readable storage device recited in claim 14, wherein the act of determining that the participant computing device is authorized to register in the transaction further comprises the following:
determining that the registration request is secured using the secure key included in the coordination context;
accessing the security key to identify one or more conditions to be met before registration is allowed; and
determining that the conditions specified in the security key have been met.

18. The computer readable storage device recited in claim 14, wherein the act of determining that the initiator computing device is authorized to initiate the transaction comprises the following:
an act of determining that the initiator computing device is in a particular role that includes all computing entities that are authorized to initiate a transaction.

19. The computer readable storage device recited in claim 14, wherein the participant computing device is a first participant computing device, the registration request is a first registration request, and the relationship is a first relationship, the environment further including a second participant computing device, the method further comprising the following:
receiving a second registration request from the second participant computing device to register in the transaction, the second registration request being secured using the secure key included in the coordination context; and
determining that the participant computing device is authorized to register in the transaction based at least in part on the second registration request being secured by the secure key; and
registering the participant computing device in the transaction as having a second relationship in the transaction.

20. The computer readable storage device recited in claim 19, wherein the method further comprises:
receiving a first post-registration request from the first participant computing device to do a first action appropriate for the first relationship in the transaction;
determining that the first action is appropriate for the first relationship in the transaction; and
authorizing the first action since the first action is appropriate for the first relationship in the transaction.

21. The computer readable storage device recited in claim 20, wherein the method further comprises:
receiving a second post-registration request from the second participant computing device to do a second action appropriate for the second relationship in the transaction;
determining that the second action is appropriate for the second relationship in the transaction; and authorizing the second action since the second action is appropriate for the second relationship in the transaction.

22. The computer readable storage device recited in claim 20, wherein the method further comprises:
   receiving a second post-registration request from the second participant computing device to do a second action that is not appropriate for the second relationship in the transaction;
   determining that the second action is not appropriate for the second relationship in the transaction; and
   denying authorization for the second action since the second action is not appropriate for the second relationship in the transaction.

23. The computer readable storage device recited in claim 19, wherein the method further comprises:
   receiving a first post-registration request from the first participant computing device to do a first action that is not appropriate for the first relationship in the transaction;
   determining that the first action is not appropriate for the first relationship in the transaction; and
   denying authorization for the first action since the first action is not appropriate for the first relationship in the transaction.

* * * * *